(12) United States Patent
Burton et al.

(10) Patent No.: US 7,712,582 B2
(45) Date of Patent: May 11, 2010

(54) LIFTING DEVICE AND METHOD

(75) Inventors: Stewart A. Burton, 47 Rockford Ct, Milford, CT (US) 06461; Robert R. Hellman, Jr., Oxford, CT (US)

(73) Assignee: Stewart A. Burton, Milford, CT (US)

( * ) Notice: Subject to any disclaimer, the term of this patent is extended or adjusted under 35 U.S.C. 154(b) by 16 days.

(21) Appl. No.: 10/578,083

(22) PCT Filed: Nov. 4, 2004

(86) PCT No.: PCT/US2004/036728
§ 371 (c)(1),
(2), (4) Date: May 2, 2007

(87) PCT Pub. No.: WO2005/044713
PCT Pub. Date: May 19, 2005

(65) Prior Publication Data
US 2007/0295562 A1  Dec. 27, 2007

Related U.S. Application Data

(60) Provisional application No. 60/517,323, filed on Nov. 4, 2003.

(51) Int. Cl.
*B60P 1/10* (2006.01)

(52) U.S. Cl. ........................ 187/238; 254/4 C; 254/7 C; 414/490

(58) Field of Classification Search ................ 187/231, 187/244, 238; 414/490; 254/4 C, 7 C, 9 C
See application file for complete search history.

(56) References Cited

U.S. PATENT DOCUMENTS

| | | | | | |
|---|---|---|---|---|---|
| 1,228,162 A | * | 5/1917 | Anderson | ................... | 187/238 |
| 2,778,515 A | * | 1/1957 | Hanson | ....................... | 414/448 |
| 3,445,958 A | * | 5/1969 | Troxell et al. | ............... | 446/465 |
| 3,907,138 A | * | 9/1975 | Rhodes | ....................... | 414/448 |
| 3,907,322 A | * | 9/1975 | Kiryu | ........................ | 280/654 |
| 4,056,170 A | * | 11/1977 | Chelin | ........................ | 187/237 |
| 4,579,504 A | * | 4/1986 | Lemme et al. | ............. | 414/607 |
| 5,549,317 A | * | 8/1996 | Dunkle | ........................ | 280/652 |
| 5,575,605 A | * | 11/1996 | Fisher | ........................ | 414/490 |
| 5,938,396 A | * | 8/1999 | Audet | ........................ | 414/490 |
| 5,951,037 A | * | 9/1999 | Hsieh et al. | ................. | 280/655 |
| 5,951,234 A | * | 9/1999 | Johansson | ................... | 414/495 |
| 6,131,927 A | * | 10/2000 | Krawczyk | ............... | 280/47.29 |
| 6,273,438 B1 | * | 8/2001 | Prapavat | .................. | 280/47.21 |
| 6,425,599 B1 | * | 7/2002 | Tsai | ........................... | 280/652 |
| 6,540,241 B2 | * | 4/2003 | Lee | .......................... | 280/43.12 |
| 6,561,745 B2 | * | 5/2003 | Rountree | .................... | 414/490 |
| 6,921,095 B2 | * | 7/2005 | Middleby | ............... | 280/47.29 |
| 6,971,654 B2 | * | 12/2005 | Amsili | ....................... | 280/47.2 |
| 6,983,856 B1 | * | 1/2006 | Burks | ......................... | 212/179 |

(Continued)

*Primary Examiner*—Thomas J. Brahan
(74) *Attorney, Agent, or Firm*—Alix, Yale & Ristas, LLP (57) ABSTRACT

In a preferred embodiment, an apparatus, comprising: a column (42) normally generally vertical when a device (30) of which the column (42) is a part is in an operating position; and a platform (62) operatively connected at one end to the column (42) and normally generally horizontal when the device (30) is in an operating position, the platform (62) being selectively raised or lowered to raise or lower a load placed on the platform (62).

22 Claims, 14 Drawing Sheets

U.S. PATENT DOCUMENTS

2001/0038786 A1* 11/2001 Kim .......................... 414/490
2002/0109319 A1* 8/2002 Neal et al. ............... 280/47.35
2003/0197351 A1* 10/2003 Burger et al. ............... 280/651

* cited by examiner

LIFTING DEVICE AND METHOD

CROSS-REFERENCE TO RELATED APPLICATIONS

The present application is a 35 USC 371 of PCT/US2004/03628, filed Nov. 4, 2004. Benefit is claimed of the filing date of U.S. Provisional Application No. 60/517,323, filed Nov. 4, 2003.

TECHNICAL FIELD

The present invention relates to lifting devices generally and, more particularly, but not by way of limitation, to a novel lifting device and method of use thereof that are versatile and the device of the present invention can be folded for storage and transport.

BACKGROUND ART

It is a principal object of the present invention to provide a lifting device that can lift and support a load.

It is a further object of the invention to provide such a device that supports a load via a fork, surface, hook, or container.

It is an additional object of the invention to provide such a device that can be used to transport a load over a wide range of obstacles.

It is another object of the invention to provide such a device that can be used as a stable variable height work surface including the means for securing a workpiece to the same.

It is yet a further object of the invention to provide such a device that can be used to replace a hand truck, a lifting table, a portable work bench, a pallet jack, a hoist, a utility cart, and a wheelbarrow.

It is yet an additional object of the invention to provide such a device that is cost effective.

It is yet another object of the invention to provide such a device that requires a minimum number of simple elements to achieve its purpose.

A further object of the invention is to provide such a device that is capable of being folded.

An additional object of the invention is to provide such a device that is structurally efficient and lightweight.

Yet a further object of the invention is to provide such a device that is an efficient means of lifting a load.

Yet an additional object of the invention is to provide such a device that has a self-contained power source with a manual backup.

Yet another object of the invention is to provide such a device that provides a high degree of safety.

It is a further object of the invention to provide such a device that can be folded for storage and transportation.

It is an additional object of the invention to provide such a device that can be used by a consumer with minimal technical background.

Other objects of the present invention, as well as particular features, elements, and advantages thereof, will be elucidated in, or be apparent from, the following description and the accompanying drawing figures.

DISCLOSURE OF INVENTION

The present invention achieves the above objects, among others, by providing, in a preferred embodiment, an apparatus, comprising: a column normally generally vertical when a device of which said column is a part is in an operating position; and a platform operatively connected at one end to said column and normally generally horizontal when said device is in an operating position, said platform being selectively raised or lowered to raise or lower a load placed on said platform.

BRIEF DESCRIPTION OF DRAWINGS

Understanding of the present invention and the various aspects thereof will be facilitated by reference to the accompanying drawing figures, provided for purposes of illustration only and not intended to define the scope of the invention, on which.

BEST MODE FOR CARRYING OUT THE INVENTION

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

Figures 1, 5:
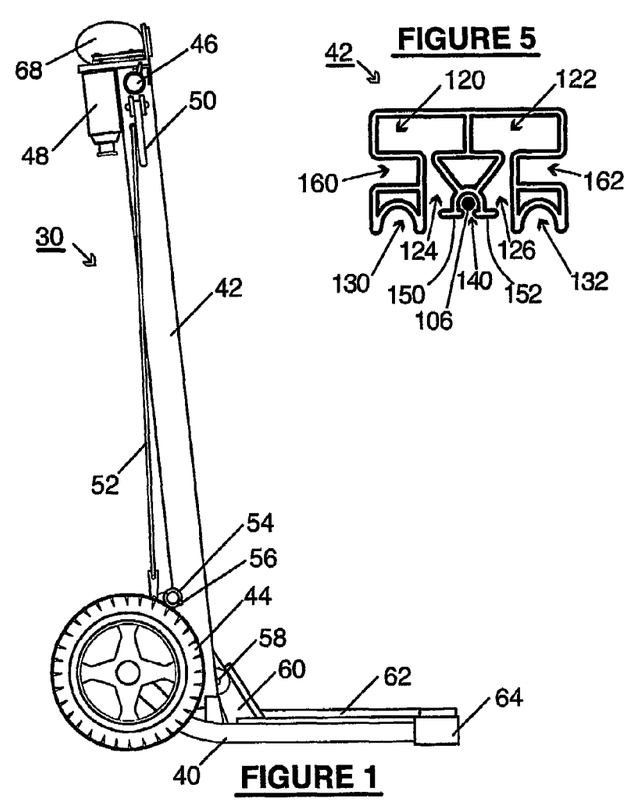
FIG. 1 is a side elevational view of the device of the present invention with the lifting platform thereof in lowered position.
FIG. 5 is a top plan view of the top of the column of the device.

FIG. 1 illustrates a lifting device, constructed according to the present invention, and generally indicated by the reference numeral 30. Major elements of device 30 shown on FIG. 1 are a chassis 40 rotatably attached at the base of a column 42, a right wheel 44 rotatably attached to the chassis, a handlebar 46 and a drive motor 48 fixedly disposed at the top of the column, a brake handle 50 rotatably disposed at the top of the column, a brake rod 52 extending from the brake handle to a brake mechanism 54 bearing a right brake 56, a right front fork bearing 58, rotatably attached to a right fork 60 (the fork bearing and the fork being described in more detail with respect to FIG. 7(A)), a removable platform 62, and a right pad 64 fixedly disposed at the front end of the chassis. A housing 68 is disposed above drive motor 48 contains a motor current overload circuit which sounds an alarm and/or flashes a light when the motor current reaches a predetermined level and an electronic tilt mechanism which also sounds an alarm and/or flashes a light when device 30 is tilted a predetermined degree.

Figure 2:
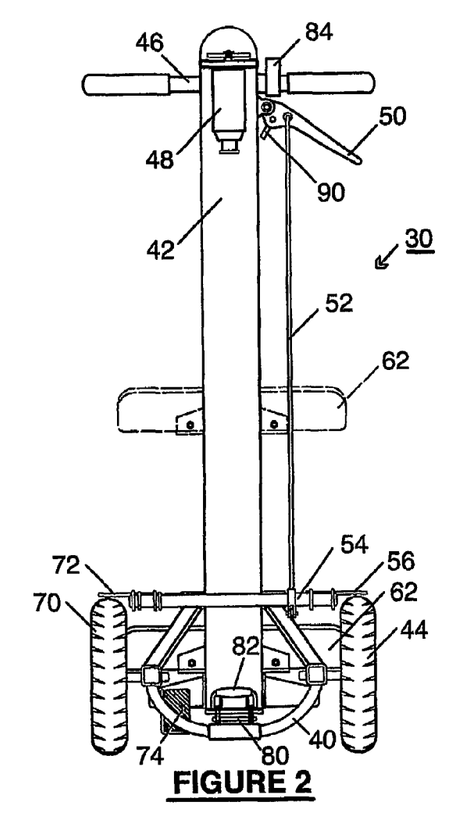
FIG. 2 is a rear elevational view of the device with the lifting platform thereof in lowered position and with an intermediate position of the lifting platform shown in broken lines.

FIG. 2 illustrates lifting device 30 and in addition to the elements described with reference to FIG. 1, shows a left wheel 70, a left brake 72, and a battery 74 for powering drive motor 48. Wiring connecting battery 74 and drive motor 48 is not shown. Also shown on FIG. 2 are a lock 80 that locks column 42 to chassis 40, with the column in near vertical position, and a control 84. The latter element is rotatable about handlebar 46 with rotation in one direction causing platform 62 to rise and rotation in the other direction causing the platform to be lowered. Platform 62 is shown in broken lines in an intermediate position. Lock 80 is described more fully with reference to FIGS. 17 and 18.

Continuing to refer to FIG. 2, the operation of brake mechanism 54 will be evident. Squeezing brake handle 50 toward handle bar 46 causes brake mechanism 54 to rotate and press right and left brakes 56 and 72 against right and left wheels 44 and 70, respectively. A locking tab 90 rotatably attached to brake handle 50 can be rotated against column 42 to hold brakes 56 and 72 against wheels 44 and 70. This is useful when it is desired to hold device 30 in place.

Figure 3:
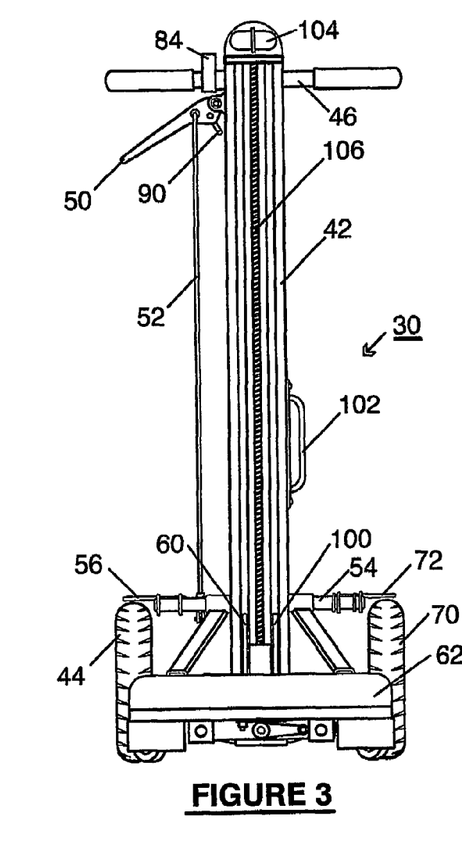
FIG. 3 is a front elevational view of the device with the lifting platform thereof in lowered position.

FIG. 3 illustrates device 30 and in addition to the elements described with reference to FIGS. 1 and 2 there is shown a left fork 100, a handle 102 fixedly attached to column 42, a light 104, and a lead screw 106. (Handle 102 and light 104 not shown on FIGS. 1 and 2). Handle 102 is useful in storing or transporting device 30.

Figure 4:
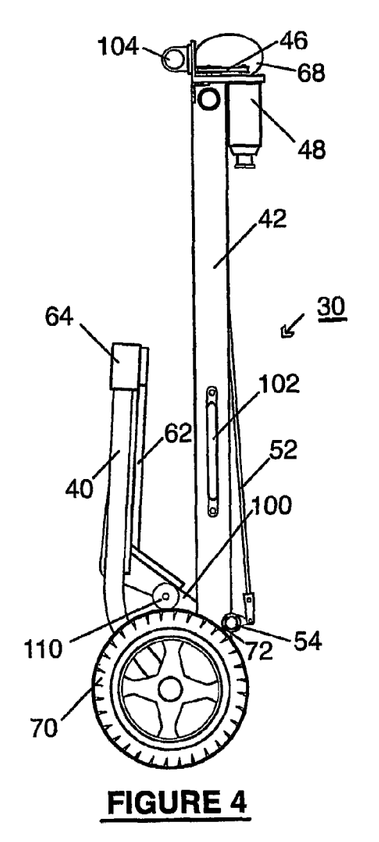
FIG. 4 is a side elevational view of the device folded for storage or transport.

FIG. 4 illustrates device 30 in folded position for storage or transport. It will be understood that lock release handle 82 (FIG. 2) has been pulled upwardly releasing lock 80 so that chassis 40 can be folded against column 42 and the lock engaged. Device 30 can now be stored or transported in the position shown or the device can be stored or transported horizontally. Also shown on FIG. 4 is left front fork bearing 110. Brake locking tab 90 can be activated when device 30 is in its folded position (FIG. 4).

FIG. 5 illustrates column 42. Two rear channels 120 and 122 extending the length of column 42 are defined in the rear of the channel and are open to the front of the column by passageways 124 and 126, respectively. Two forwardly open channels 130 and 132 extending the length of column 42 are defined in the front of the column. Lead screw 106 is disposed in a forwardly open channel 140 extending the length of the column is defined halfway between forwardly open channels 130 and 132. Two flanges 150 and 152 extending the length of column 42 extend sideways from forwardly open channel 140. Two sidewardly open channels 160 and 162 extend the length of column 42.

Figure 6:
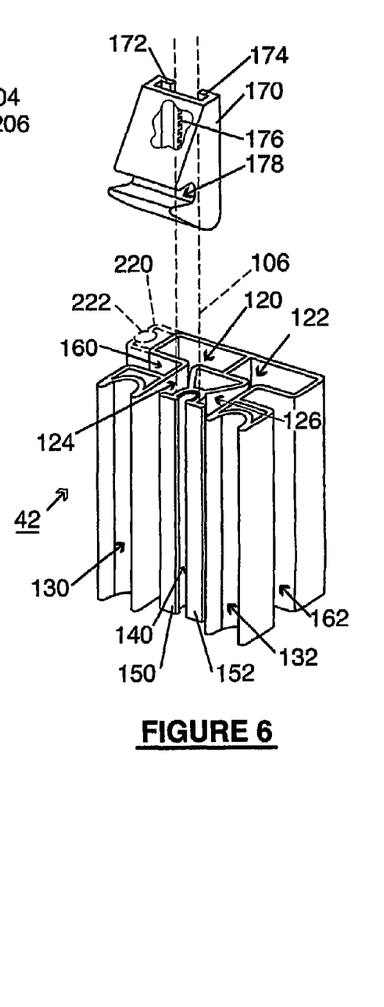
FIG. 6 is a fragmentary, isometric view of the top of the column and slide of the device.

FIG. 6 illustrates a slide 170 which has two ears 172 and 174 that slidingly engage flanges 150 and 152, a rearwardly facing vertical gear 176 extends into forwardly open channel 140 and engages leadscrew 106 (not shown on FIG. 6), and a forwardly open horizontal channel 178.

Figures 7A, 7B:
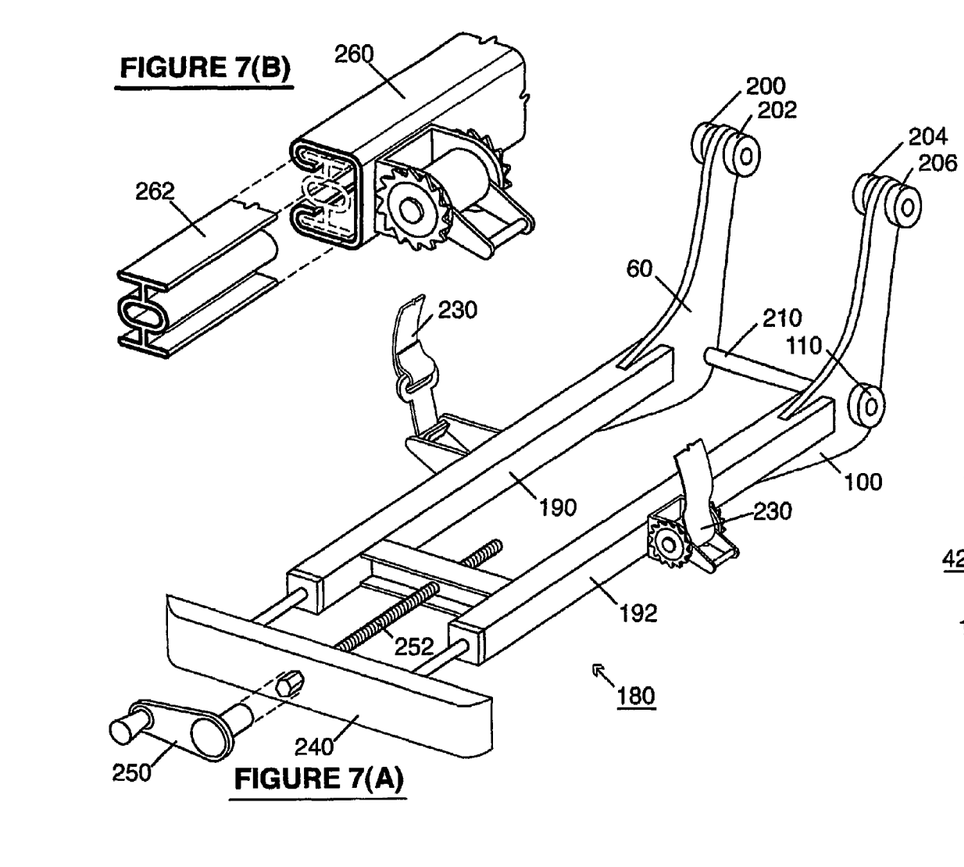
FIG. 7(A) is an isometric view of one embodiment of the forks of the device.
FIG. 7(B) is a fragmentary, isometric view of a further embodiment of the forks of the device.

FIG. 7(A) illustrates a carriage generally indicated by the reference numeral 180. Carriage 180 includes right and left forks 60 and 100 fixedly attached to horizontal fork extensions 190 and 192, respectively. Two rear fork bearings 200 and 202 are horizontally rotatingly disposed at the upper end of right fork 60 and two rear fork bearings 204 and 206 are horizontally rotatingly disposed at the upper end of left fork 100.

Referring back to FIG. 6, it will be understood that rear fork bearings 200 and 202 ride up and down in channel 120, while rear fork bearings 204 and 206 ride up and down in channel 122. At the same time, front left fork bearing 110 rides up and down in channel 132, while front right fork bearing 58 (FIG. 1) rides up and down in channel 130. The force raising and lowering forks 60 and 100 is provided by the engagement of a horizontal rod 210 with channel 178. Thus, as leadscrew 106 turns, slide 170 will ride up and/or down, causing forks 60 and 100 to ride up and/or down. Passageways 220 and 222 may be defined in column 42, respectively, for wiring for drive motor 48 (FIG. 2) and brake rod 52.

Referring again to FIG. 7(A), one or more tie downs 230 may be provided along the length of fork extensions 190 and 192. An adjustable horizontal nosepiece 240 extends from the ends of forks extensions 190 and 192 and is adjustable by means of a hand crank 250 and screw 252.

FIG. 7(B) illustrates that a fork attachment 260 can be adjustable by virtue of interfitting stationary fork embodiment extension 262.

Figure 8:
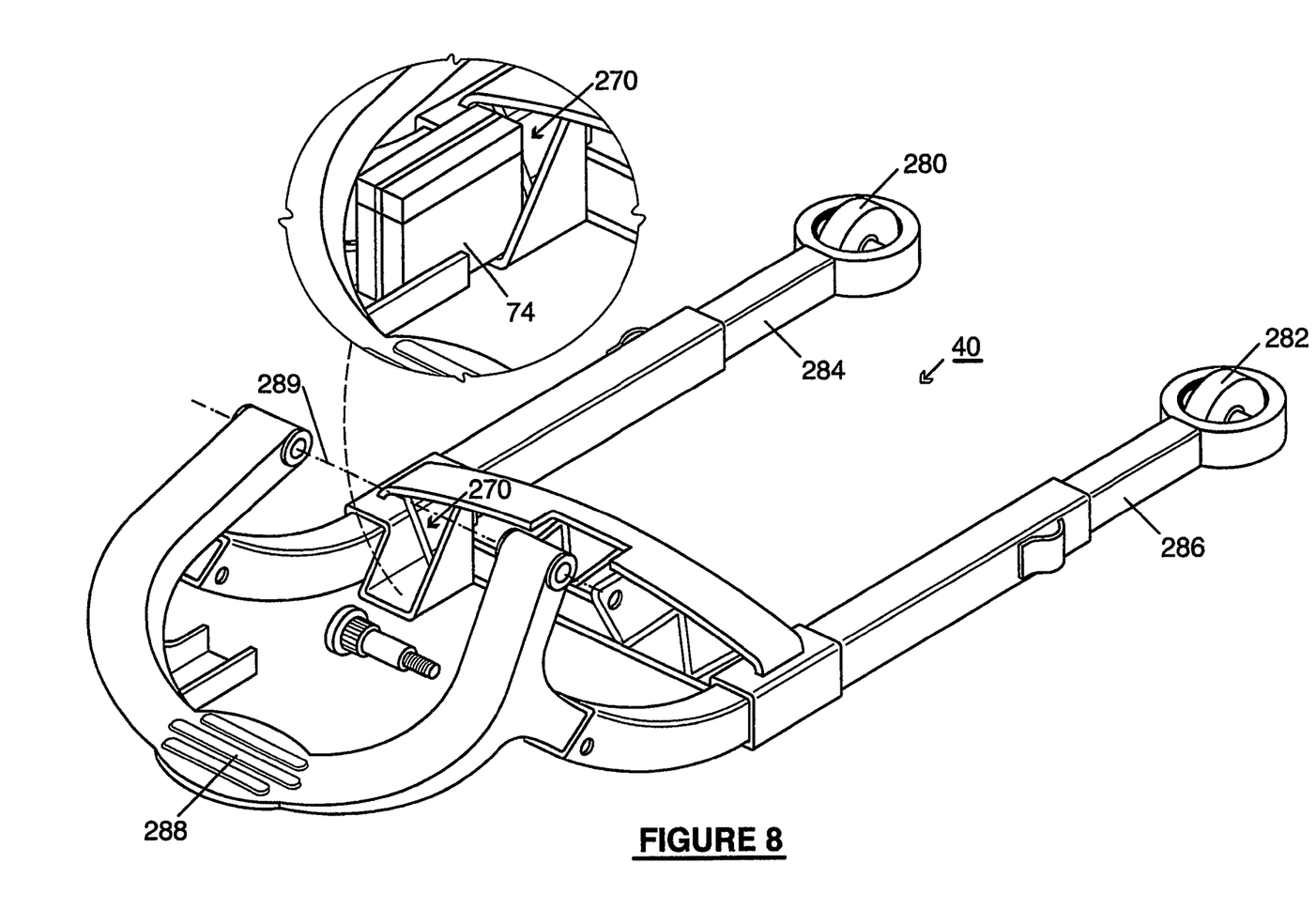
FIG. 8 is an isometric view of one embodiment of the chassis of the device, without lock 80.

FIG. 8 illustrates one embodiment of chassis 40. Here, battery compartment 270 is more clearly shown. Front wheels 280 and 282 are rotatably mounted, respectively, at the distal ends of leg extensions 284 and 286 and a foot pad 288 is provided at the proximal end of chassis that is useful when the operator requires assistance in tilting device 30 back or adding his or her weight to the rear of the chassis to prevent the device from falling forward, as might occur in the case of lifting an overhanging load. Also indicated on FIG. 8 is a line 289 about which column 42 rotates from an operating position (FIG. 1) to a folded position (FIG. 4).

Figure 9:
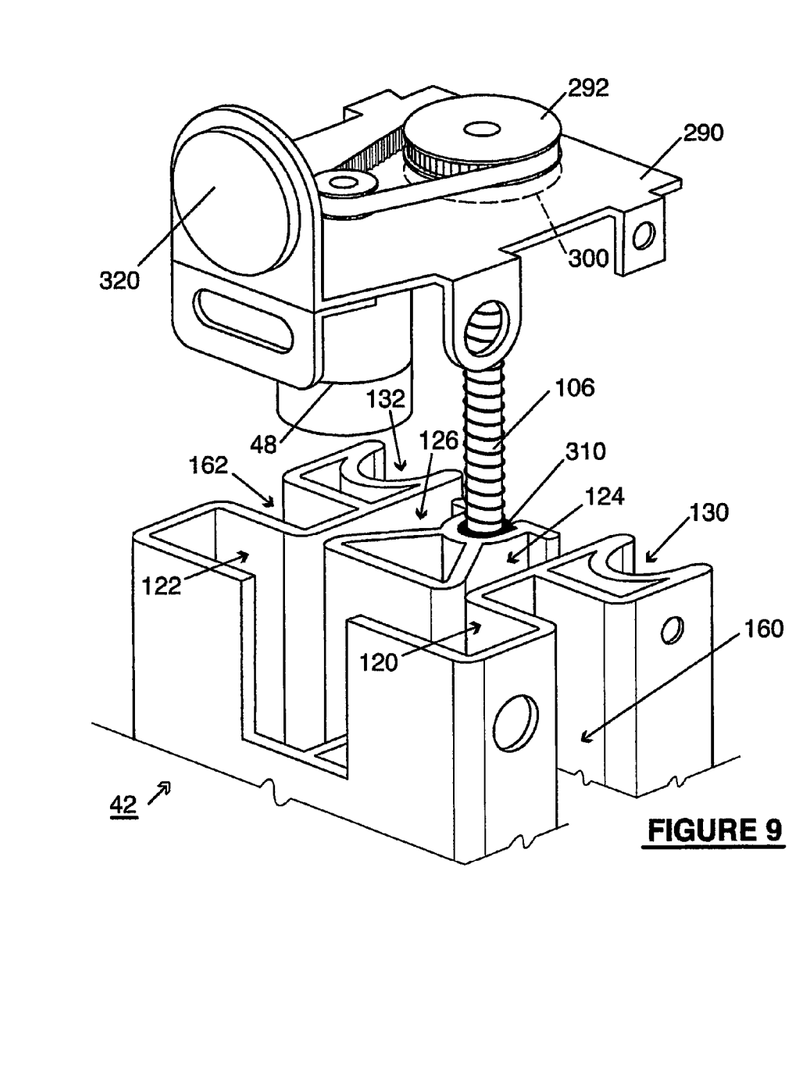
FIG. 9 is a fragmentary, isometric view of the top of the column of the device, showing the lead screw and the drive motor, with the housing removed.

FIG. 9 illustrates a top plate 290 (shown, for convenience as spaced apart from the top of column 42, but fixedly attached to the top of the column) on which is mounted drive motor 48 and reduction gearing 292. A leadscrew bearing 300 axially and radially supports the upper end of leadscrew 106. A leadscrew sleeve 310 extends the length of column 42. Also shown on FIG. 9 is an upper ball foot 320 which engages a surface on which device 30 rests when column 42 is in a horizontal position.

Figures 10, 11, 12:
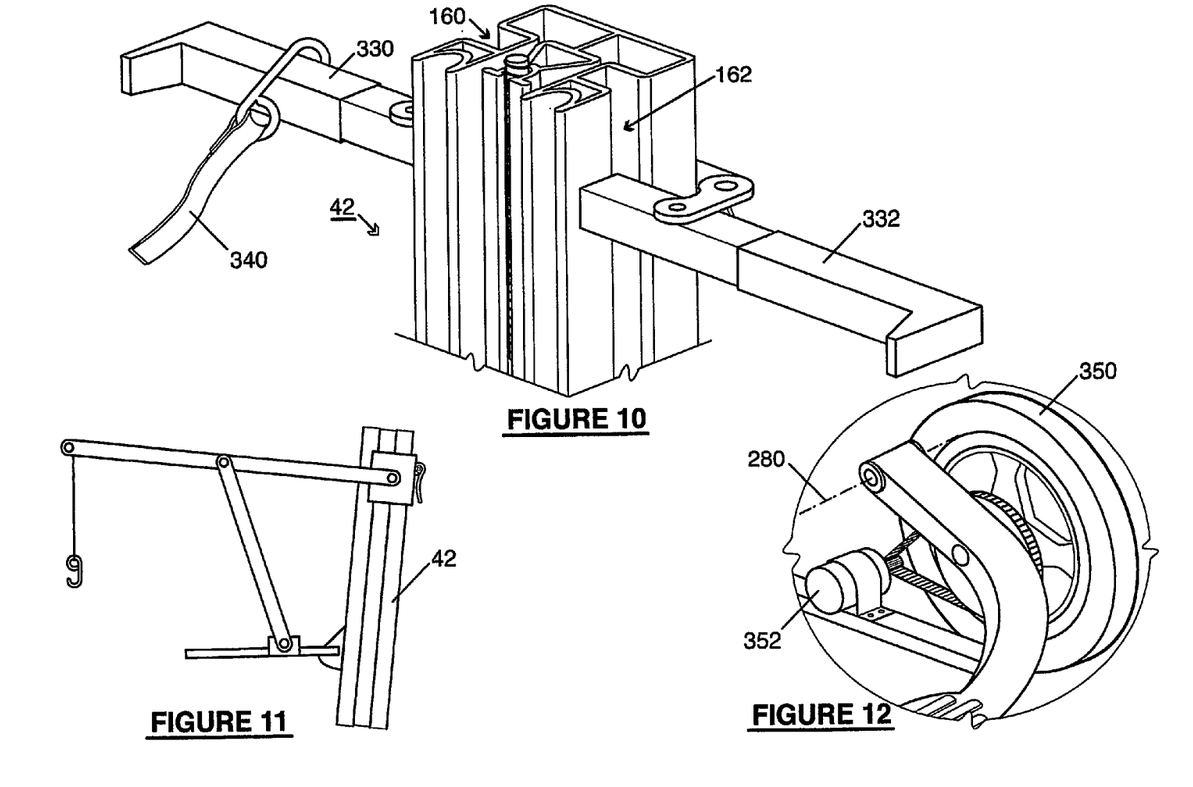
FIG. 10 is an isometric view showing one method of restraining or securing a load.
FIG. 11 is a fragmentary, side elevational view showing the device used as a crane.
FIG. 12 is a fragmentary, isometric view of a main wheel of the device with a motor drive.

FIG. 10 illustrates adjustable horizontal arms 330 and 332 disposed, respectively, in channels 160 and 162. One or more tie down straps 340 may be hooked to one or both of the arms (only one end of a strap shown).

FIG. 11 illustrates device 30 optionally used as a crane.

FIG. 12 illustrates a rear wheel 350 driven by an electric motor 352.

Figure 13:
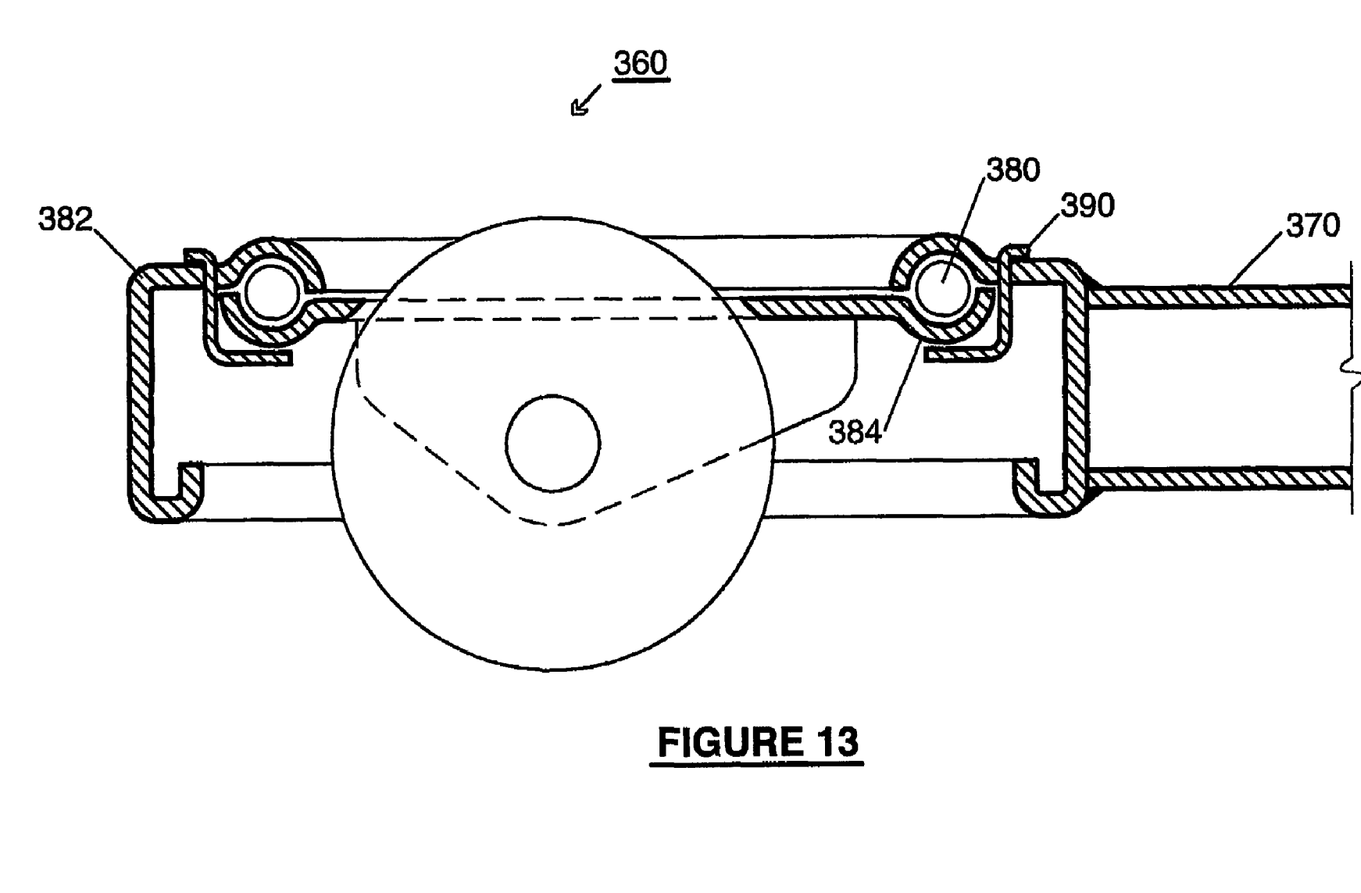
FIG. 13 is a side elevational view of one embodiment of a front wheel of the device.

FIG. 13 illustrates one embodiment of a front wheel generally indicated by the reference numeral 360. Wheel 360 is fixedly disposed at the distal end of a leg extension 370. Wheel 360 includes a plurality of balls, as at 380, disposed between an upper raceway 382 and a lower raceway 384. Wheel 360 is supported by lower raceway 384 and is horizontally offset from the midpoint of the lower raceway. Keepers 390 keep the upper raceway 382 and the lower raceway 384 together.

Figure 14A:
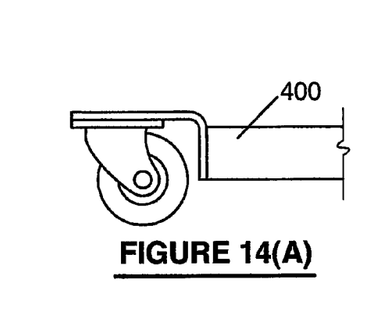
FIGS. 14(A)-14(F) show various embodiments of front wheels.
Figure 14B:
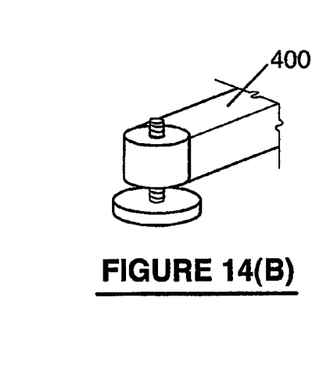
Figure 14C:
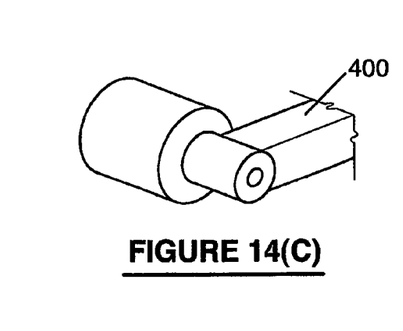
Figure 14D:
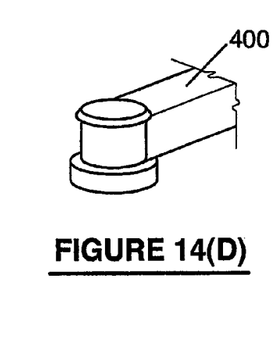
Figure 14E:
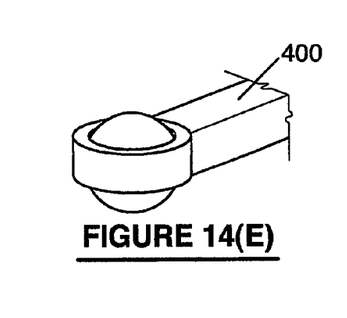
Figure 14F:
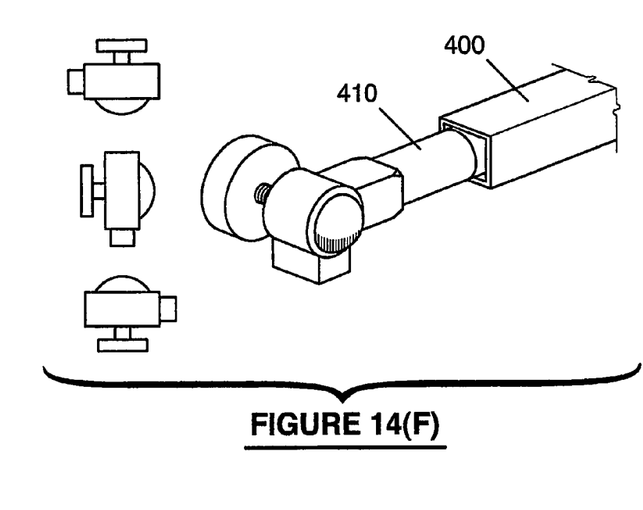

FIGS. 14(A)-14(F) show various embodiments of front wheels attached to a leg 400. FIG. 14(F) combines the embodiments shown on FIGS. 14(B), 14(D), and 14(E). The embodiments are mounted on an extension 410 and the embodiment is selected by pulling, rotating, and releasing the extension. The figures at the left side of FIG. 14(F) show the various embodiments.

Figure 15:
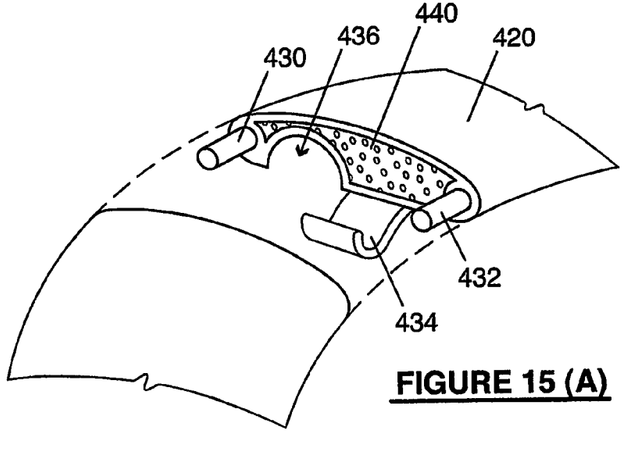
FIGS. 15(A)-15(C) show a wheel collar.

FIG. 15(A) illustrates a wheel collar 420 that can be placed around a wheel to dramatically increase the footprint of the wheel as may be required when traversing soft surfaces such as grass, sand or loose soil with device 30 heavily loaded. Wheel collar 420 includes two locating pins 430 and 432, a cam lock 434, and a tire pocket 436. Wheel collar 420 may be filled with foam 440.

FIG. 15(B) illustrates wheel collar 420 being placed around a wheel 450, while FIG. 15(C) illustrates the wheel collar in place on the wheel.

Figure 16A:
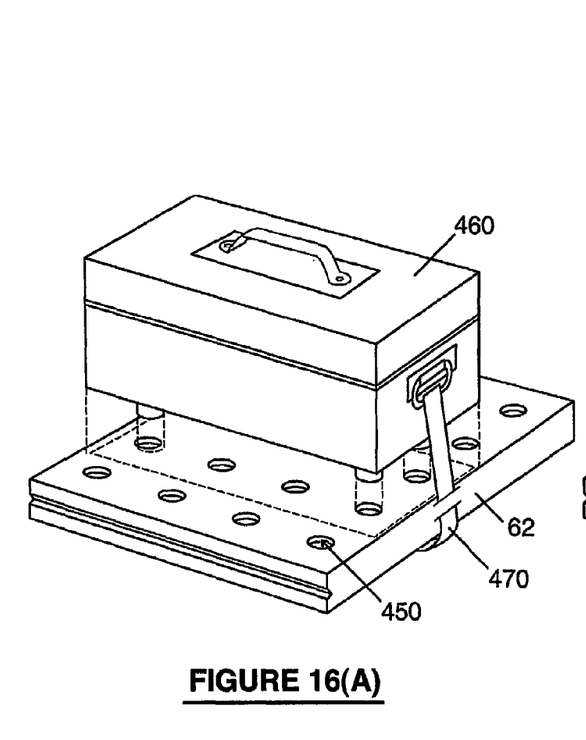
FIGS. 16(A)-16(E) show various uses to which the platform may be put.
Figure 16B:
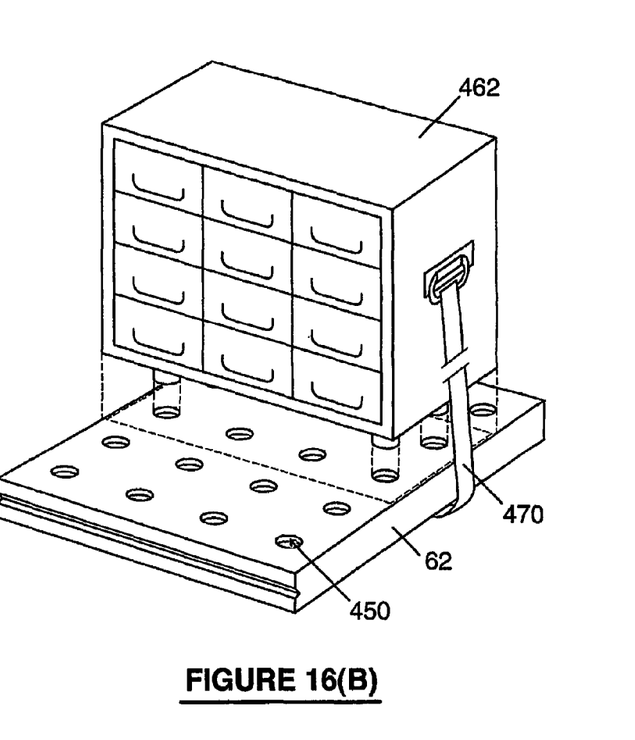

FIG. 16(A) illustrates that platform 62 may be outfitted with a plurality of holes, as at 450. Thus outfitted, a toolbox 460 may be placed on platform 62 or a compartment box 462 may be placed on the platform as shown on FIG. 16(B). Platform 62 is of sufficient rigidity that one or more tie down straps 470 may be sufficiently anchored and tensioned in a variety of locations, preferably anywhere around the entire perimeter of the platform. For more severe requirements, one or more flush mounted ratcheting tie down stations with additional reinforcement may be provided.

Figure 16C:
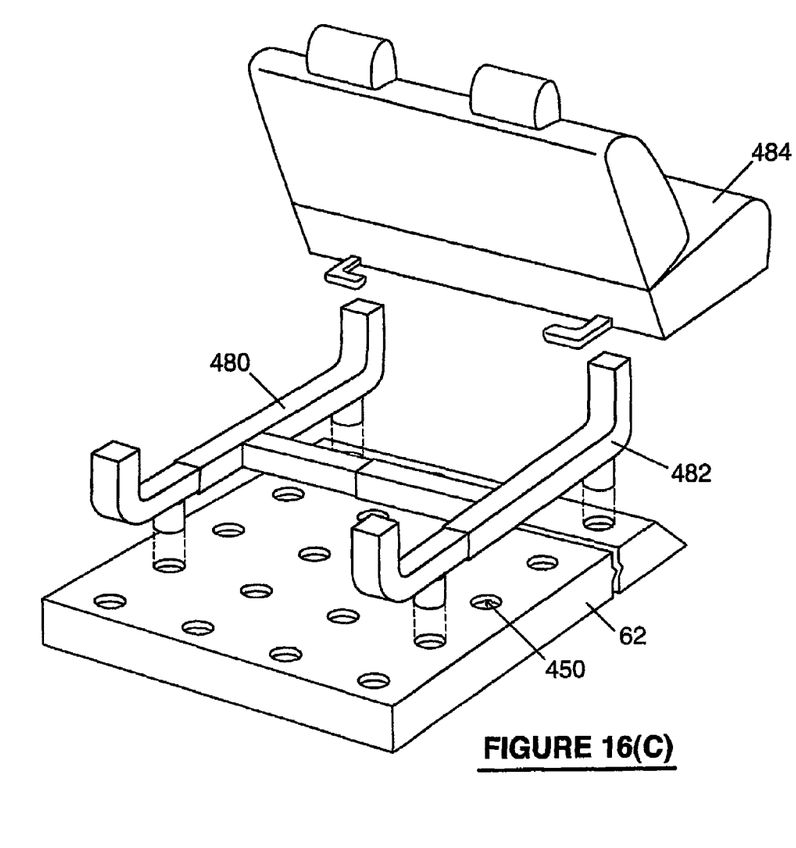

FIG. 16(C) illustrates platform 62 outfitted with two riser frames 480 and 482 which engage a seat 484. Riser frames may be particularly helpful in extracting and replacing rear seats of SUV's where the space between the vehicle's seat belt attachments and adjusters coupled with the depth (to clear the rear bumper) required to pick up the seat makes this a challenge.

Figure 16D:
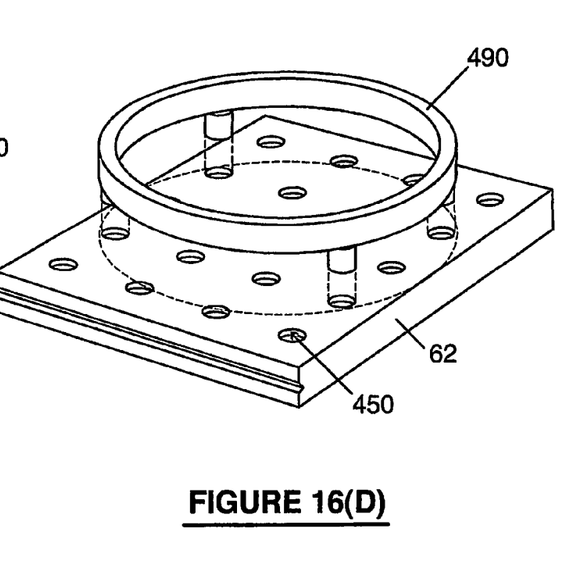

FIG. 16(D) illustrates platform 62 outfitted with a ring 490 for lifting circular items such as trash cans.

Figure 16E:
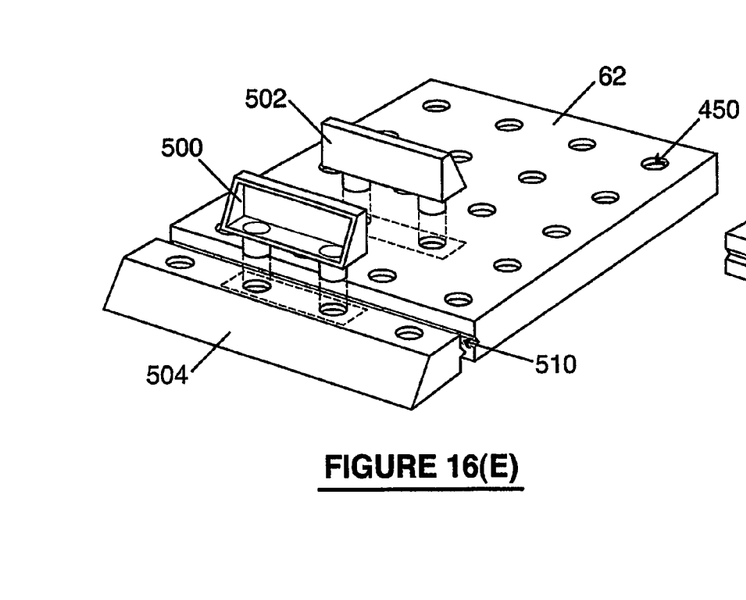

FIG. 16(E) illustrates platform 62 outfitted with two clamps 500 and 502 to effect a vise, with clamp 500 being disposed in a nosepiece 504. Nosepiece 504 preferably has a beveled leading edge to aid in slipping platform 62 under a load such as a cardboard box. A V-groove 510 disposed on an edge of platform 62 acts as a jaw and aid in locating and capturing round stock.

Figure 17:
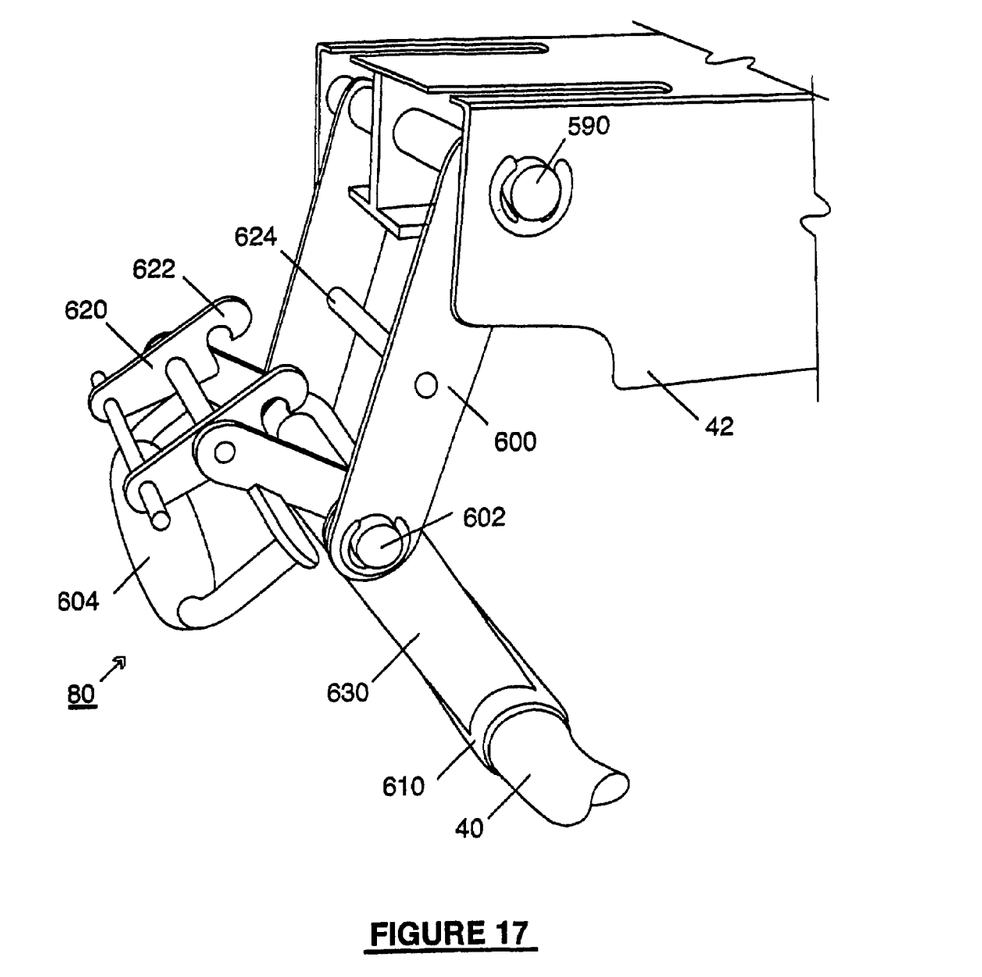
FIGS. 17 and 18 are isometric views showing the operation of lock 80.
Figure 18:
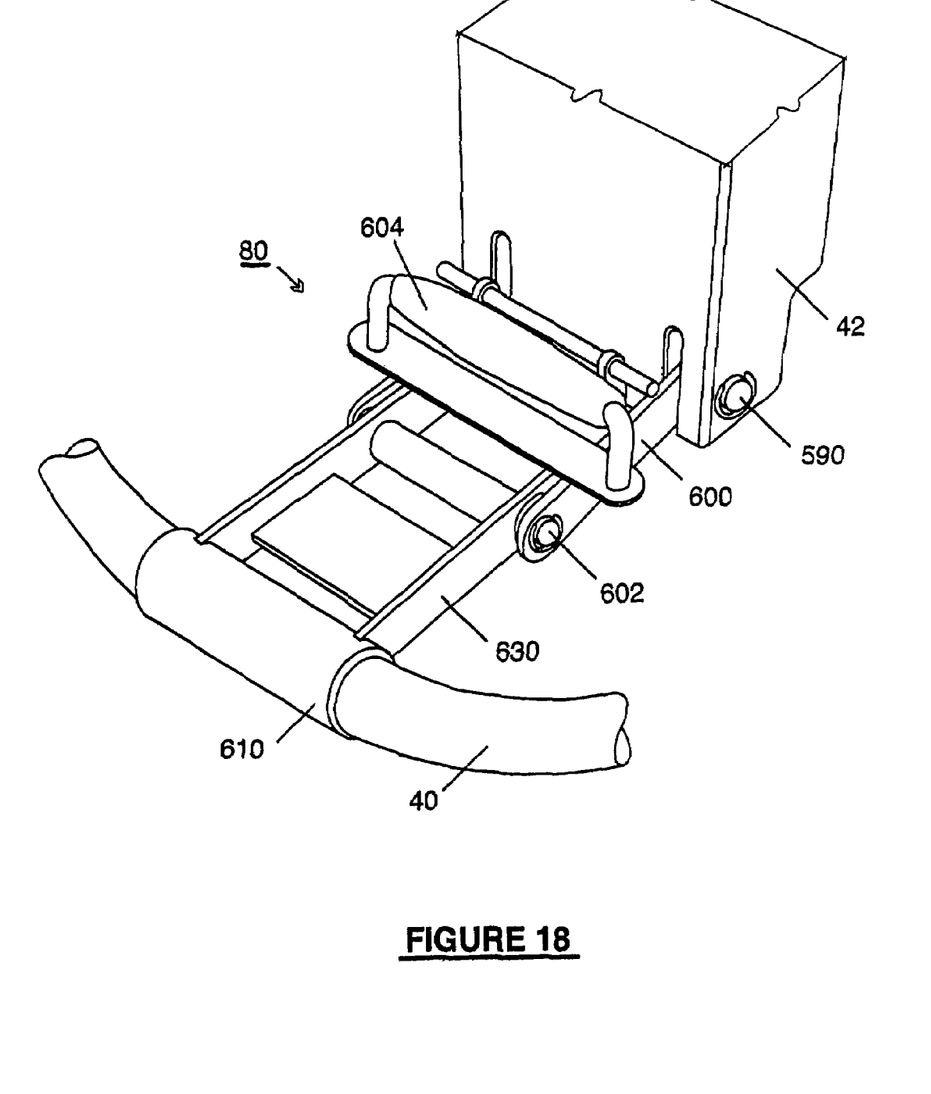

FIGS. 17 and 18 illustrate the operation of lock 80.

Referring first to FIG. 17, column 42 is shown in folded position having been rotated about pivot 289 (FIG. 8). A link 600 rotatably attached to pivot 590 extends from the pivot and is rotatably attached at a second pivot 602 to a handle 604. Handle 604 is fixedly attached to a sleeve 610 which is rotatable about chassis 40. A spring-loaded catch mechanism 620 is rotatably attached to handle 604 and includes catches 622 that engage a horizontal bar 624 extending between the sides of link 600 when column 42 is in an unfolded position.

While the dimensions and weight of device 30 can be varied depending on the use thereof, the device shown is about fifty-four inches high and weighs about forty pounds (FIG. 1-3).

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A lifting device comprising:
  a central column generally vertical when the lifting device is in an operating position, said column including two rear channels and two forwardly open channels extending the length of said column, each of said forwardly open channels having a rear wall and each of said rear channels having a front and rear wall and a passageway in said front wall open to the front of said column;
  a carriage positioned to the front of said column and normally generally horizontal when the lifting device is in an operating position,
  a pair of spaced forks at one end of said carriage, each having an one end connected to said carriage and the other end operatively connected to said column;
  at least one rear bearing adjacent the other end of each of said forks, said rear bearing of one of said forks riding in one of said rear channels between said front and rear walls with its associated fork extending through the associated passageway and the said rear bearing of the other of said forks riding in the other of said rear channels between said front and rear walls with its associated fork extending through the associated passageway; and
  a fork bearing on each fork positioned downwardly and forwardly from the rear bearing, said fork bearing of one of said forks riding in one of said forwardly open channels against said rear wall and the fork bearing of the other of said forks riding in the other of said forwardly open channels against said rear wall whereby said carriage is moveable along said column.

2. The lifting device of calm 1 further including a slide having two ears, said column having two flanges, said ears engaging said flanges to support said slide for movement along said column, and a lead screw in engagement with said slide to move said slide along said column upon rotation of said lead screw, said slide being operatively connected to said forks to move said forks along said column as said lead screw is rotated.

3. The lifting device of claim 2 wherein said lead screw is disposed within said column.

4. The lifting device of claim 3 wherein said lead screw is rotated by an electric motor, said electric motor receiving power from a source internal to said device.

5. The lifting device of claim 3, wherein said lead screw is disposed in a forwardly open lead screw channel in said column positioned between said channels in which said fork bearings are positioned, said flanges extend sideways from either side of said lead screw channel, and said slide has a rearwardly facing gear that extends into said lead screw channel into operative engagement with said lead screw.

6. The lifting device of claim 2 further including a rod extending between the spaced forks, said slide having a forwardly opening channel therein, and said rod being received in said channel.

7. The lifting device of claim 1 wherein said device can be folded with said column and said carriage generally parallel, so that said device can be transported or stored.

8. The lifting device of claim 7 wherein said device includes a brake mechanism that can be activated when said device is folded.

9. The lifting device of claim 7 further comprising a handle attached to said column to aid in carrying said device when said device is in its folded position.

10. The lifting device of claim 1 wherein a chassis attached to a lower end of said column underlies said carriage and rests on a surface upon which said device is disposed.

11. The lifting device of claim 10 wherein said device has first wheels disposed at a lower end of said column and pads and/or second wheels disposed at a distal end of said chassis.

12. The lifting device of claim 11 wherein at least one of said first wheels is driven by a motor.

13. The lifting device of claim 11 wherein each of said second wheels comprises:
(a) a vertical circular wheel disposed on a horizontal shaft;
(b) said horizontal shaft operatively connected to a horizontal plate disposed above said horizontal shaft; and
(c) said horizontal plate engaging generally horizontal ball bearings disposed between a plate fixedly connected to said carriage and said horizontal plate, said plate being disposed beneath said horizontal plate.

14. The lifting device of claim 11 wherein each of said second wheels comprises at least two configurations manually selectable by rotation of said second wheels.

15. The lifting device of claim 11 wherein each of said first wheels has a relatively soft circular movable covering placed thereabout to assist said first wheels in maneuvering across soft terrain.

16. The lifting device of claim 15 wherein said relatively soft circular movable covering is filled with a foam material.

17. The lifting device of claim 1 wherein said carriage can be selectively manually lengthened or shortened.

18. The lifting device of claim 1 further comprising an upper ball foot disposed at an upper end of said column that engages a surface on which said device is placed when said column is horizontal.

19. The lifting device of claim 1 further comprising arms extending generally horizontally from said column to stabilize said load.

20. The lifting device of claim 19 further comprising at least one strap extending from at least one of said arms to stabilize said load.

21. The lifting device of claim 1 further comprising a crane structure extending from said column.

22. The lifting device of claim 1 wherein said carriage is configured to hold thereon a toolbox, a chest of drawers, a seat of a vehicle, a circular container, or an object in a vise disposed at an edge of said carriage.

* * * * *